C. F. P. CARRIER.
PISTON PACKING RING.
APPLICATION FILED JULY 20, 1921.
1,403,008.
Patented Jan. 10, 1922.
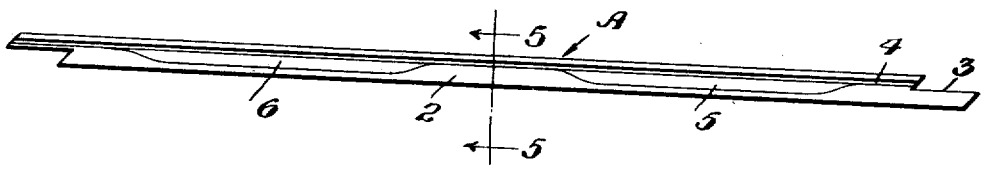
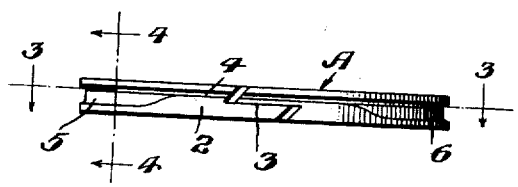
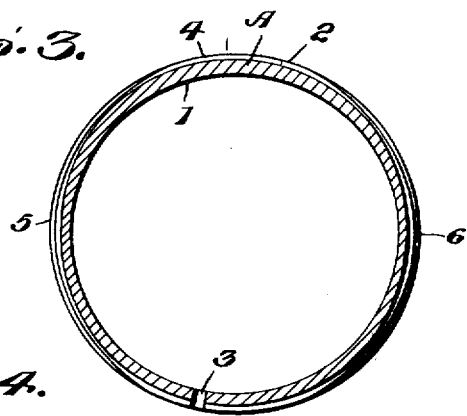
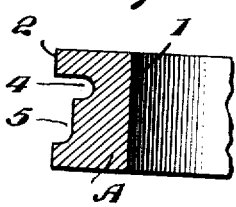
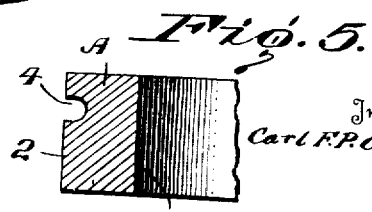
Inventor
Carl F.P. Carrier,
By
Everett G. Clements
Attorney

UNITED STATES PATENT OFFICE.

CARL F. P. CARRIER, OF PHILADELPHIA, PENNSYLVANIA.

PISTON PACKING RING.

1,403,008.  Specification of Letters Patent.  Patented Jan. 10, 1922.

Application filed July 20, 1921. Serial No. 486,168.

*To all whom it may concern:*

Be it known that I, CARL F. P. CARRIER, a citizen of the United States, residing at Philadelphia, in the county of Philadelphia and State of Pennsylvania, have invented certain new and useful Improvements in Piston Packing Rings, of which the following is a specification.

My invention relates to improvements in piston packing rings and particularly to that type of ring used in single acting engines.

Engines of this general class, of which the internal combustion engine forms the larger part, depend, for their efficiency, upon the continued proper fit of the piston and piston rings within the engine cylinder. It has been found that wear most frequently occurs at two points, said points being located on diametrically opposite sides of the piston at right angles to the axis of the connecting rod wrist-pin, such wear being due to the side thrust of the piston against the cylinder wall during the angular displacement of the connecting rod on compression and expansion strokes. It is therefore necessary that these portions of the piston and piston rings which are subjected to this uneven compression from side thrust, receive a more thorough lubrication than is required for the other portions. It is important that the piston ring should yield more readily at these points than at others, in order that the rubbing or peripheral surface of the ring shall bear evenly against the cylinder wall throughout its entire length in order to effect uniform tension and wear.

It is therefore the object of my invention to eliminate the disadvantages in rings such as are now on the market and provide a ring with a circumferential oil-sealing groove in which wear and tension occur uniformly throughout in use.

Other objects and advantages of my improved piston ring will be more apparent from the following detailed description, in connection with the accompanying drawings; wherein:

Figure 1 is a view of an imaginary piston ring flattened out to show both sides of the rubbing surface.

Fig. 2 is a side elevation of the piston ring in its normal shape.

Fig. 3 is a horizontal section taken on line 3—3 of Fig. 2, showing the shape of the circumferential oil-sealing groove and the shallow oil pockets arranged on diametrically opposite sides of the ring.

Fig. 4 is a transverse section on line 4—4 of Fig. 2, showing one of the oil pockets and the increased depth of the circumferential oil-sealing groove; and Fig. 5 is a transverse section on line 5—5 of Fig. 1, showing the normal depth of the circumferential oil-sealing groove.

Referring to the drawings wherein similar characters indicate similar parts, A represents a piston packing ring of generally conventional form, having an inner and an outer peripheral surface 1 and 2, and a zigzag severance 3 at one point, to permit the ring to expand, contract, or otherwise yield to afford the required resiliency. An oil sealing groove 4 extends circumferentially around the outer peripheral surface 2 of the ring A, parallel with and adjacent to one of the edges thereof, as is clearly shown in Fig. 1. This groove 4 is somewhat elliptical in shape and gradually increases in depth as it extends in opposite directions from the zigzag severance 3 to points diametrically opposite and half the way around the circumference of the ring A, then gradually decreases in depth to a point diametrically opposite the zigzag severance 3. The tension of the ring A is thus reduced on opposite sides thereof by increasing the depth of the oil groove 4, as is clearly shown by comparison of Figs. 4 and 5.

It is desired however to further reduce the tension of the ring adjacent these two points, and, by the same means, to reduce friction in use by supplying an additional quantity of oil to the rubbing surfaces subjected to the side thrust and consequent increased friction, as previously explained. To this end I provide a pair of relatively short grooves or oil pockets 5 and 6 which extend parallel to and communicate at one side with the oil groove 4.

The oil pockets 5 and 6 are relatively shallow and wider than the oil groove 4 with which they communicate, forming, in effect, a continuous groove having portions of increased width intermediate the ends thereof. These oil pockets are of substantially uniform depth throughout their length, gradually merging into the surface 2, of the ring A, at their ends, as shown in Figs. 1 and 2.

In use the circumferential groove 4 is filled with oil on the down stroke of the piston, due to the scraping action of its sharp upper edge on the cylinder wall, which causes oil, previously splashed or otherwise supplied to the cylinder wall, to enter the groove 4 and fill the oil pockets 5 and 6. A continuous ring of oil is thus maintained between the ring A and the cylinder wall, and, as the cohesive attraction of the oil is greater than the compression of the engine a very effective seal is provided. The oil collected in the groove 4 on the down stroke of the piston serves to lubricate the hot walls of the cylinder on the return or up stroke thereof, an additional quantity of oil being supplied to the portions of the cylinder wall adjacent the wide oil pockets 5 and 6 where friction from side thrust occurs.

Wear is inevitable in certain degrees, however, even in properly lubricated piston rings, as the ring forms the bearing for the piston in the engine cylinder, and unevenness in wear as a result of increased friction at certain points on the ring's rubbing surface, materially shortens the usefulness of the ring. The wear must therefore be uniform throughout, and I have found that by reducing the tension of the ring adjacent the points where increased friction occurs, the useful life of the ring is greatly lengthened. It will be noted that the tensile strength of the ring is materially reduced to prevent undue wear at the portions 5 and 6, see Figs. 1 and 3, where the ring has been milled out to increase the depth of the groove 4 and form the oil pockets 5 and 6. It is obvious that by reducing the tension of the ring at these points, increased resiliency is thus afforded, permitting the ring to conform to the wall of the cylinder as wear occurs.

While I have shown and described a piston ring provided with a circumferential oil-sealing groove varying in depth and width at points where reduced tension is desired, it is obvious that other methods of accomplishing this end would be suggested to those skilled in the art. I therefore do not wish to be limited to the details herein shown, except as required by a reasonable interpretation of the appended claims.

Having described my invention, what I claim as new and desire to secure by Letters Patent, is:

1. A piston packing ring having sectors of the periphery reduced to provide portions of lesser tension on diametrically opposite sides of the ring and a peripheral oil groove communicating with said reduced portions.

2. A split piston ring provided with a circumferential groove of non-uniform contour providing portions of maximum depth on diametrically opposite sides of said ring and portions of minimum depth intermediate said deepened portions.

3. A piston packing ring provided with a reduced portion to vary the tension thereof, said reduced portion being of greater length than width and merging into the peripheral surface of said ring intermediate the upper and lower edges thereof.

4. A piston packing ring provided with two reduced portions to vary the tension thereof on opposite sides of said ring, said reduced portions being of greater length than width and merging into the peripheral surface of said ring intermediate the upper and lower edges thereof.

5. A split piston ring provided with a peripheral oil groove varying in depth and width at points intermediate the ends thereof.

6. A split piston ring provided with a circumferential groove varying in depth at points intermediate the ends thereof and widened adjacent said deepened portions.

7. A split piston ring having a peripheral oil groove and oil pockets arranged adjacent said groove.

8. A split piston ring having a peripheral groove providing spaced walls, and oil pockets arranged adjacent said groove and merging into one of said walls.

9. A split piston ring having a circumferential oil groove varying in depth at points intermediate the ends thereof, and oil pockets arranged adjacent said groove and communicating therewith.

10. A split piston ring having a circumferential oil groove varying in depth at points intermediate the ends thereof, and relatively short oil pockets arranged adjacent said groove and communicating therewith at said points.

In testimony whereof I affix my signature in the presence of two witnesses.

CARL F. P. CARRIER.

Witnesses:
 WILLIAM F. CLARK, Jr.,
 D. C. BERNHARDT.